(12) United States Patent
Xiong

(10) Patent No.: US 7,660,569 B2
(45) Date of Patent: Feb. 9, 2010

(54) METHODS AND APPARATUS FOR DIGITAL JAMMER DETECTION

(75) Inventor: Wei Xiong, Menlo Park, CA (US)

(73) Assignee: QUALCOMM Incorporated, San Diego, CA (US)

(*) Notice: Subject to any disclaimer, the term of this patent is extended or adjusted under 35 U.S.C. 154(b) by 526 days.

(21) Appl. No.: 11/517,118

(22) Filed: Sep. 6, 2006

(65) Prior Publication Data

US 2007/0232219 A1     Oct. 4, 2007

Related U.S. Application Data

(60) Provisional application No. 60/789,498, filed on Apr. 4, 2006.

(51) Int. Cl.
*H04B 1/10* (2006.01)

(52) U.S. Cl. .................................. 455/296; 455/239.1

(58) Field of Classification Search .............. 455/296, 455/254, 255, 278.1, 285, 239.1
See application file for complete search history.

(56) References Cited

U.S. PATENT DOCUMENTS

| | | |
|---|---|---|
| 2002/0119763 A1 | 8/2002 | Ramachandran |
| 2002/0123319 A1* | 9/2002 | Peterzell ............... 455/296 |
| 2005/0026564 A1 | 2/2005 | Haub |

FOREIGN PATENT DOCUMENTS

| | | |
|---|---|---|
| EP | 0999649 | 5/2000 |
| EP | 1022861 | 7/2000 |
| GB | 2393052 | 9/2002 |
| WO | 02056490 | 7/2002 |
| WO | 2004042937 | 5/2004 |
| WO | 2005099109 | 10/2005 |

OTHER PUBLICATIONS

ISR-PCT-US07-115323—Oct. 11, 2007.

* cited by examiner

*Primary Examiner*—Tu X Nguyen
(74) *Attorney, Agent, or Firm*—Gerald P. Joyce, III

(57) ABSTRACT

Methods and apparatus for digital jammer detection. In an aspect, a method is provided for detecting a jammer in a received waveform. The method includes filtering the received waveform to produce a filtered waveform and subtracting the filtered waveform from the received waveform to produce a difference waveform. The method also includes determining a power differential associated with the difference waveform, and detecting the jammer if the power differential exceeds a selected threshold. In an aspect, an apparatus is provided that includes a filter configured to filter the received waveform to produce a filtered waveform and combining logic configured to subtract the filtered waveform from the received waveform to produce a difference waveform. The apparatus also includes power determination logic configured to determine a power differential associated with the difference waveform, and decision logic configured to detect the jammer if the power differential exceeds a selected threshold.

45 Claims, 6 Drawing Sheets

METHODS AND APPARATUS FOR DIGITAL JAMMER DETECTION

CLAIM OF PRIORITY UNDER 35 U.S.C. §119

The present application for patent claims priority to Provisional Application No. 60/789,498 entitled "DIGITAL JAMMER DETECTION" filed Apr. 4, 2006, and assigned to the assignee hereof and hereby expressly incorporated by reference herein.

BACKGROUND

1. Field

The present application for patent relates generally to communication systems, and more particularly, to methods and apparatus for digital jammer detection for use in a communication system.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed and delivered to devices on a network. For example, a communication network may utilize Orthogonal Frequency Division Multiplexing (OFDM) to provide communications between a network server and one or more mobile devices. In this technology, a stream of OFDM symbols forming a transmit signal are packed with services to be delivered over the distribution network. Each symbol comprises a number of sub-carriers that are modulated by the data to be transmitted.

Unfortunately, a receiving device may receive a waveform that comprises the transmit signal in addition to one or more interfering signals. For example, an interfering signal (or jammer) may be caused by a nearby transmitter that is transmitting on an adjacent frequency band. In this case, the receiving device needs to have excellent linearity performance to distinguish between the desired transmit signal and the jammer. However, operating with increased linearity performance requires additional power consumption. Conversely, if a jammer is not present in the received waveform, it may be inefficient to operate with increased linearity performance.

Therefore, it would be advantageous to have a system that operates to detect the presence of a jammer in a received waveform. The system should also provide a power conserving mechanism that adjusts linearity performance based on whether or not a jammer is detected.

SUMMARY

In one or more aspects, a detection system is provided that operates to detect the presence of a jammer in a received waveform. The detection system operates to adjust a power-vs-linearity performance characteristic of a receiving device based on whether or not a jammer is detected. Thus, the detection system operates to provide power efficiency because device power consumption is reduced unless a jammer is detected.

In an aspect, a method is provided for detecting a jammer in a received waveform. The method comprises filtering the received waveform to produce a filtered waveform and subtracting the filtered waveform from the received waveform to produce a difference waveform. The method also comprises determining a power differential associated with the difference waveform, and detecting the jammer if the power differential exceeds a selected threshold.

In an aspect, an apparatus is provided for detecting a jammer in a received waveform. The apparatus comprises a filter configured to filter the received waveform to produce a filtered waveform and combining logic configured to subtract the filtered waveform from the received waveform to produce a difference waveform. The apparatus also comprises power determination logic configured to determine a power differential associated with the difference waveform, and decision logic configured to detect the jammer if the power differential exceeds a selected threshold.

In an aspect, an apparatus is provided for detecting a jammer in a received waveform. The apparatus comprises means for filtering the received waveform to produce a filtered waveform and means for subtracting the filtered waveform from the received waveform to produce a difference waveform. The apparatus also comprises means for determining a power differential associated with the difference waveform, and means for detecting the jammer if the power differential exceeds a selected threshold.

In an aspect, a computer-readable medium is provided that has a computer program comprising instructions, which when executed by at least one processor, operate to detect a jammer in a received waveform. The computer program comprises instructions for filtering the received waveform to produce a filtered waveform and instructions for subtracting the filtered waveform from the received waveform to produce a difference waveform. The computer program also comprises instructions for determining a power differential associated with the difference waveform and instructions for detecting the jammer if the power differential exceeds a selected threshold.

In an aspect, at least one processor is provided that is configured to perform a method for detecting a jammer in a received waveform. The method comprises filtering the received waveform to produce a filtered waveform and subtracting the filtered waveform from the received waveform to produce a difference waveform. The method also comprises determining a power differential associated with the difference waveform, and detecting the jammer if the power differential exceeds a selected threshold.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DESCRIPTION

The following description describes one or more aspects of a detection system. The detection system operates to detect a jammer in a received waveform that includes a desired transmit signal. The detection system operates to adjust a power-vs-linearity performance characteristic of a receiving device based on whether or not a jammer is detected. Thus, the detection system operates to provide power efficiency because device power consumption is reduced unless a jammer is detected. The system is especially well suited for use in portable devices having limited resources, but may be used with any type of device. The system may also be used in devices operating in any type of network environment, including but not limited to, communication networks, public networks, such as the Internet, private networks, such as virtual private networks (VPN), local area networks, wide area networks, long haul networks, or any other type of data or communication network.

Figure 1:
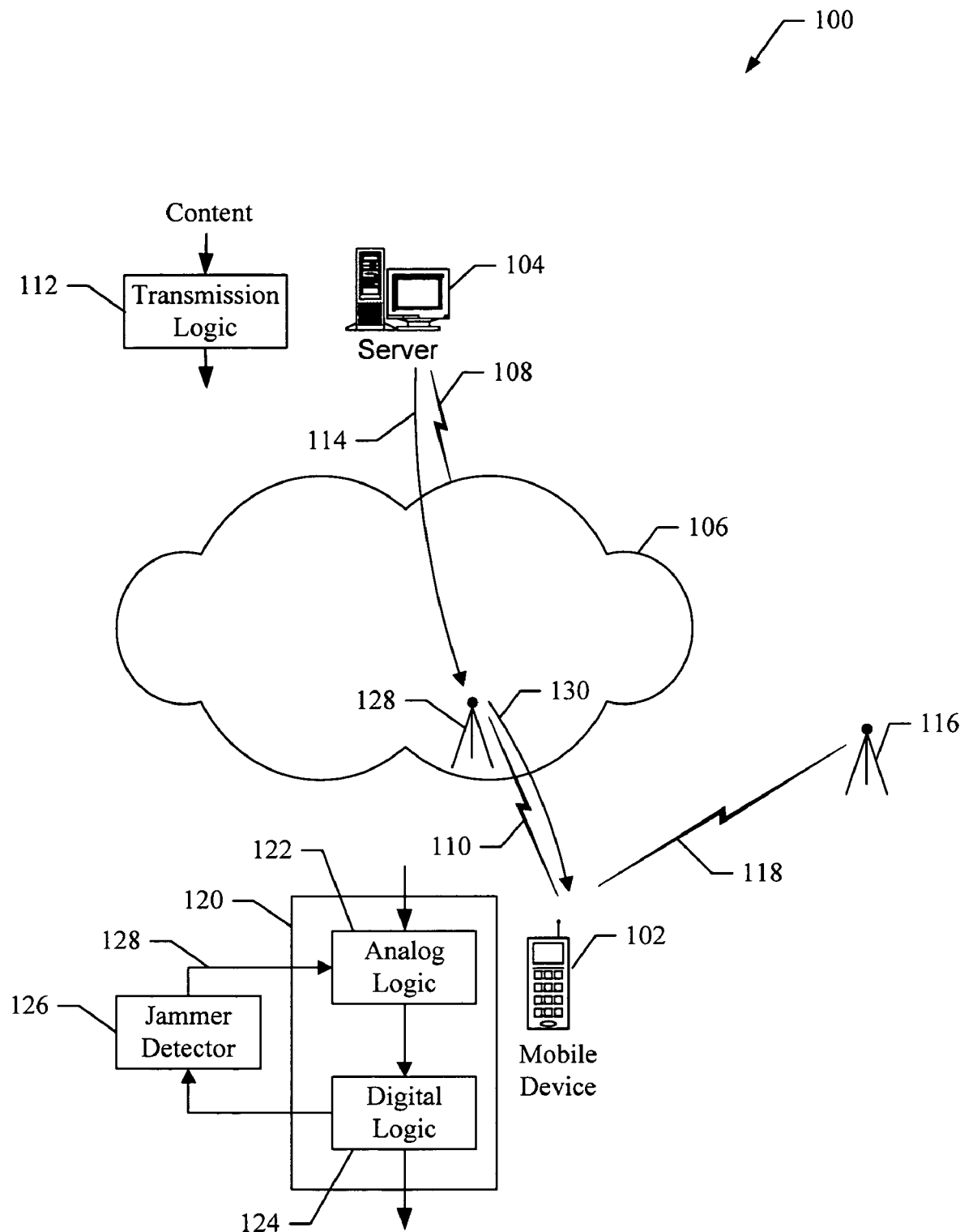
FIG. 1 shows a network that comprises an aspect of a detection system.

FIG. 1 shows a network 100 that comprises an aspect of a detection system. The network 100 comprises a mobile device 102, a server 104, and a data network 106. For the purpose of this description, it will be assumed that the data network 106 operates to provide communications between the server 104 and one or more mobile devices using wireless OFDM technology, however, aspects of the detection system are suitable for use with other transmission technologies.

In an aspect, the server 104 operates to provide services that may be subscribed to by devices in communication with the network 106. The server 104 is coupled to the network 106 through the communication link 108. The communication link 108 comprises any suitable communication link, such as an optical backhaul link that operates to allow the server 104 to communicate with the network 106. The network 106 comprises any combination of wired and/or wireless networks that allows services to be delivered from the server 104 to devices in communication with the network 106, such as the device 102.

The device 102 comprises a mobile device that communicates with the network 106 through the wireless link 110. In an aspect, the wireless link 110 comprises a forward communication link based on OFDM technology and a reverse link based on any suitable technology including cellular telephony.

It should be noted that the network 106 may communicate with any number and/or types of portable devices. For example, other devices suitable for use in aspects of the detection system include, but are not limited to, a personal digital assistant (PDA), email device, pager, a notebook computer, mp3 player, video player, or a desktop computer.

The server 104 comprises content that includes real time and/or non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to transmission logic 112 that operates to encode the content into a transmit signal 114 that is transmitted over the network 106. When the transmit signal 114 reaches transmitter 128 it is transmitted to the device 102 over the wireless link 110 as transmit signal 130. Additionally, another transmitter 116, which may also be transmitting near the device 102, transmits a signal 118 that is also received by the device 102. Thus, the device 102 receives a radio frequency (RF) waveform that comprises the desired transmit signal 130 and a jammer 118.

The device 102 comprises a receiver 120 that includes analog receiving logic 122 and digital receiving logic 124. For example, the analog receiving logic 122 operates to receive the RF waveform and convert it to baseband waveform. The digital receiving logic 124 operates to receive the baseband waveform and convert it to a digital sequence that can be demodulated to obtain the transmitted content.

The receiver 120 operates to provide a selected linearity performance. For example, the linearity performance of the receiver 120 determines how well the receiver 120 is able to distinguish the transmit signal 130 from the jammer 118. However, high linearity performance is associated with higher power consumption. Thus, the device 102 operates with an initial power-vs-linearity performance characteristic that is set to provide satisfactory performance under most transmission conditions.

The device 102 also comprises a jammer detector 126. The jammer detector 126 operates to detect when a jammer is present in the received waveform. In an aspect, the jammer detector 126 operates to receive digital information from the digital logic 124 to determine a power differential. The power differential is an indicator that indicates a difference in total power between digitally filtered and unfiltered versions of the received waveform.

The power differential is filtered and compared to a threshold value to determine if a jammer is detected. In an aspect, the threshold value is set based on demodulator performance. For example, if the power differential is greater than the threshold value the presence of a jammer is detected. Once a jammer is detected, a detection indicator 128 is output to the analog logic 122. In response to the detection indicator 128, the power-vs-linearity performance of the analog logic 122 is adjusted to increase linearity performance so that the desired transmit signal 130 can be distinguished from the jammer 118. Increasing linearity may also increase power consumption, which may reduce the battery life of the device 102. Alternatively, if a jammer is not detected, the power-vs-linearity performance of the analog logic 122 may be adjusted to decrease linearity performance so that the desired transmit signal 130 can be received while device power is conserved.

In an aspect, the detection system operates to perform one or more of the following functions.

1. receive a waveform comprising a desired transmit signal and a possible jammer.
2. digitize the received waveform to produce a digital waveform.
3. filter the digital waveform to produce a filtered waveform.
4. subtract the filtered waveform from the digital waveform to produce a difference waveform.
5. determine a power differential associated with the difference waveform.
6. determine that a jammer is present if the power differential exceeds a detection threshold.
7. adjust a power-vs-linearity characteristic of a receiving device to distinguish the desired transmit signal from the jammer.
8. adjust the detection threshold based on demodulator performance.

Thus, aspects of the detection system operate to efficiently detect the presence of a jammer in a received waveform. The system also outputs a detection indicator that is used to adjust a power-vs-linearity characteristic of a receiver.

Figure 2:
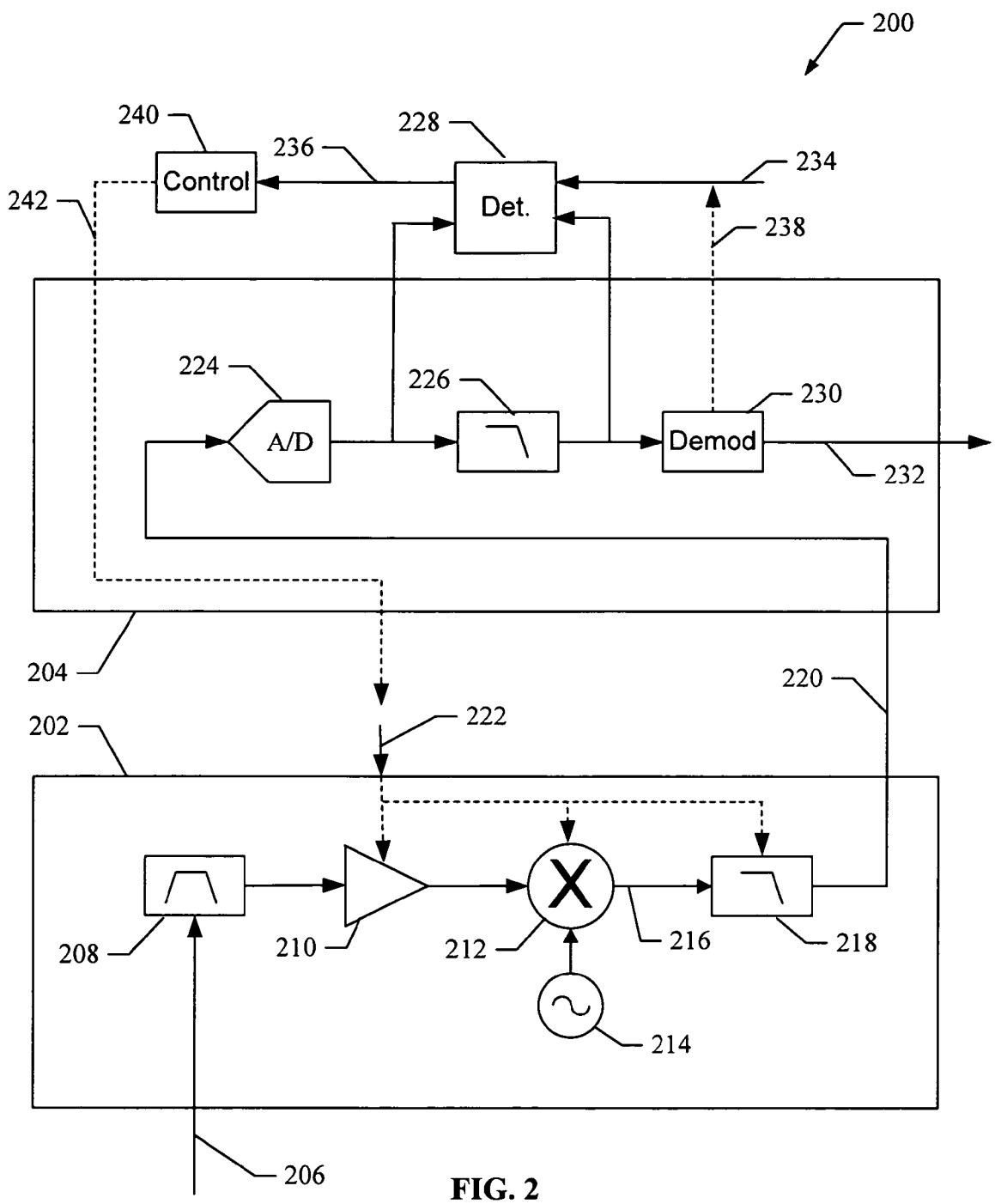
FIG. 2 shows a receiver for use in aspects of a detection system.

FIG. 2 shows a receiver 200 for use in an aspect of a detection system. For example the receiver 200 is suitable for use as the receiver 120 shown in FIG. 1. The receiver 200 comprises an analog section 202 and a digital section 204. A received RF waveform 206 is received by a band pass filter 208 of the analog section 202. The received RF waveform 206 comprises a desired transmit signal and possibly a jammer. The band pass filter 208 filters the received RF waveform 206 to produce an output that is input to an amplifier 210. The amplifier 210 outputs an amplified signal that is input to a down converter 212. The down converter 212 mixes its input with a reference 214 to produce a down-converted baseband waveform 216. The baseband waveform 216 is input to a baseband filter 218 to produce an analog waveform 220. It should be noted that the analog section 202 operates with a selected power-vs-linearity performance. For example, the analog section 202 comprises a linearity control input 222 that is used to adjust a bias condition that controls the linearity performance of the analog section 202. For example, the linearity control input 222 provides a mechanism to adjustment the bias condition of the amplifier 210, down converter 212, and/or the baseband filter 218.

The analog waveform 220 is input to an analog-to-digital (A/D) converter 224 of the digital section 204. The A/D 224 outputs digital information that is input to a digital filter 226 and detection logic 228. The digital filter 226 filters the input data to produce a filtered output that is input to a demodulator 230 and the detection logic 228. The demodulator 230 operates to demodulate the digital data to obtain transmitted content and services, as shown at 232.

The detection logic 228 receives a threshold indicator 234 and operates to provide a detection indicator 236 if a jammer is detected in the received waveform 206. For example, in an aspect, the detection logic 228 determines a power differential between the input and output of the digital filter 226. The power differential is compared to the threshold indicator 234, and if the power differential exceeds the threshold indicator 234 the detection indicator 236 is generated to indicate that a jammer was detected in the received waveform 206. A more detailed description of the detection logic 228 is provided in another section of this document.

In an aspect, the threshold indicator 234 is provided by the demodulator 230 as shown at 238. For example, the demodulator 230 outputs the threshold indicator 238 based on the performance of the demodulator 230. For example, an increase in demodulation errors indicates a jammer may be present and so the threshold 238 may be decreased. As will be shown, decreasing the threshold level causes the linearity performance of the receiver 200 to be increased, which also consumes more power. Conversely, increasing the threshold level causes the linearity performance of the receiver 200 to be decreased, which consumes less power.

In an aspect, the detection output 236 is input to control logic 240. The control logic 240 operates to control the power-vs-linearity performance of the receiver 200. For example, the control logic 240 outputs a linearity control signal 242. In an aspect, the linearity control signal 242 operates to control the power-vs-linearity performance of the analog section 202. In an aspect, the linearity control signal 242 is input to the linearity control input 222 to control a bias condition of the analog section 202, which is used to adjust the power-vs-linearity performance of the analog section 202.

Thus, a detection system provided by the receiver 200 operates to detect the presence of a jammer in a received waveform and adjust the power-vs-linearity performance of the receiver 200 based on a detection indicator. In an aspect, demodulator performance is used to determine a threshold for use by the detection system. It should be noted that the receiver 200 comprises just one implementation and that other implementations are possible.

Figure 3:
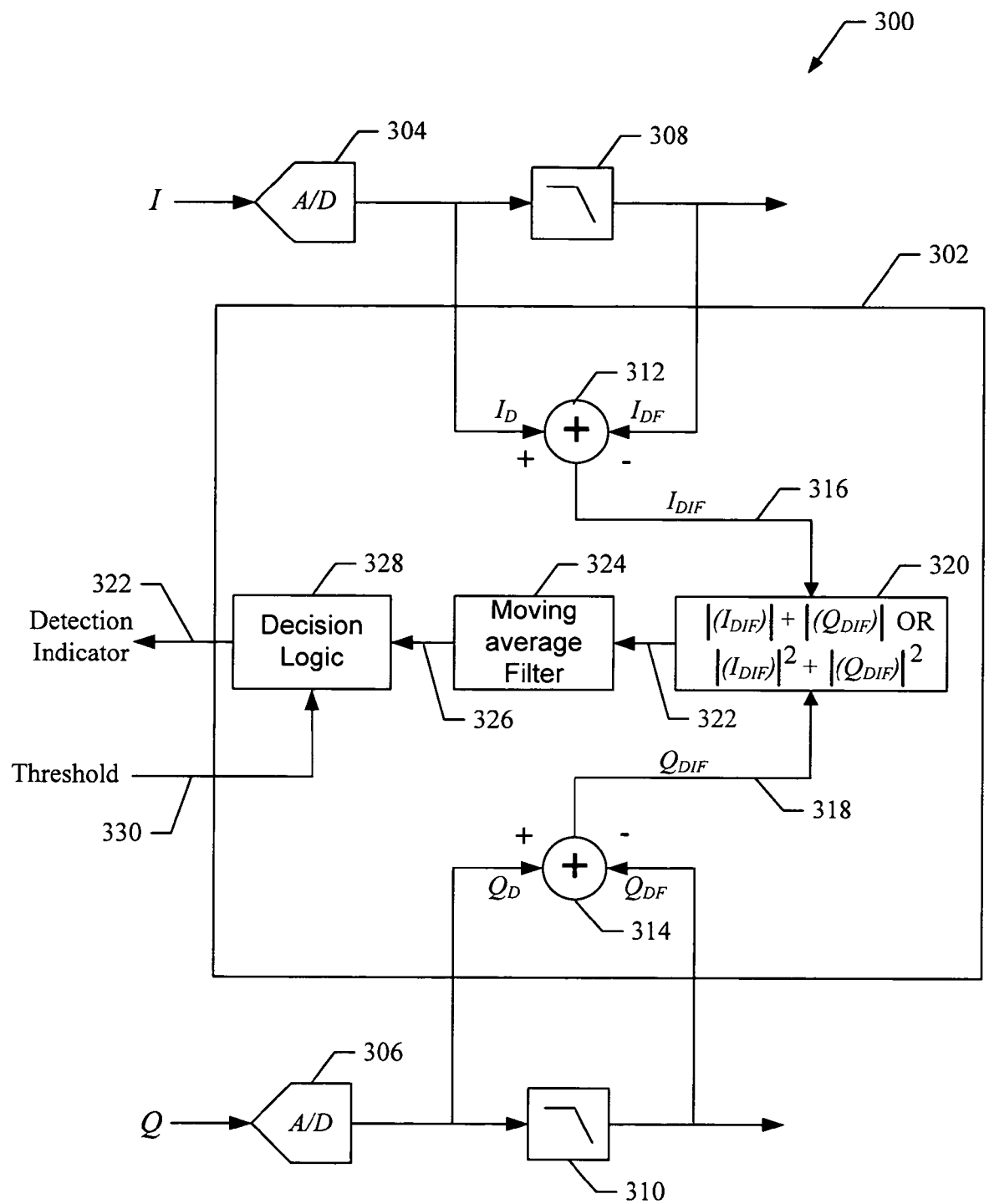
FIG. 3 shows detection logic for use in aspects of a detection system.

FIG. 3 shows an aspect of a detection system 300 comprising detection logic 302. For example, the detection logic 302 is suitable for use as the detection logic 228 shown in FIG. 2. The detection system 300 receives In-phase (I) and Quadrature (Q) component waveforms representing a received waveform. For example, the received waveform may be the waveform 206 shown in FIG. 2. In an aspect, the I and Q waveforms represent a received waveform that comprises a desired transmit signal and possibly a jammer.

The I and Q waveforms are input to A/D converters 304 and 306, respectively, that operate to output digitized waveforms $I_D$ and $Q_D$ that represent digitized versions of the I and Q waveforms. The $I_D$ and $Q_D$ digitized waveforms are input to filters 308 and 310, respectively. The $I_D$ and $Q_D$ digitized waveforms are also input to combining logic 312 and 314.

The filters 308 and 310 comprise digital filters and operate to filter the $I_D$ and $Q_D$ digitized waveforms to produce $I_{DF}$ and $Q_{DF}$ filtered waveforms that are also input to the combining logic 312, and 314. The combining logic 312 and 314 operate to subtract the $I_{DF}$ and $Q_{DF}$ filtered waveforms from the $I_D$ and $Q_D$ digitized waveforms, respectively, to form difference waveforms $I_{DIF}$ and $Q_{DIF}$ shown at 316 and 318. The $I_{DIF}$ and $Q_{DIF}$ waveforms are input to power determination logic 320 that operates to determine the power of the $I_{DIF}$ and $Q_{DIF}$ waveforms to produce a power differential 322. In an aspect, the power determination logic 320 determines the power differential 322 by summing the magnitude of the $I_{DIF}$ waveform and magnitude of the $Q_{DIF}$ waveform. In another aspect, the power determination logic 320 determines the power differential 322 by summing the square of the magnitude of the $I_{DIF}$ waveform and the square of the magnitude of the $Q_{DIF}$ waveform.

The power differential 322 is input to a moving average filter 324 that operates to filter the power differential 322 to produce a filtered power differential 326. In an aspect, the moving average filter 324 comprises an infinite impulse response (IIR) filter. In another aspect, the moving average filter 314 comprises a finite impulse response (FIR) filter. The filtered power differential 326 is input to decision logic 328. The decision logic 328 operates to compare the filtered power differential 326 to a threshold value 330 to produce a detection indicator 332. If the filtered power differential 326 is greater than the threshold value 330 then the detection indicator 332 indicates that a jammer is detected.

In an aspect, the detection logic 302 is implemented so that the filters, A/D, combining logic, power logic, control logic, and decision logic comprise individual components configured to provide the functions described herein. In another aspect, the detection logic 302 comprises a CPU, processor, gate array, digital/analog hardware logic, virtual machine, software, and/or any combination of hardware and software configured to perform the functions described herein. In another aspect the detection logic 302 is implemented by at least one processor configured to execute program instructions to perform the functions described herein.

In an aspect, the detection logic 302 comprises one or more program instructions ("program instructions") stored on a computer-readable media, which when executed by at least one processor, provides the functions described herein. For example, the program instructions may be loaded into the detection logic 302 from a computer-readable media, such as a floppy disk, CDROM, memory card, FLASH memory device, RAM, ROM, or any other type of memory device or computer-readable medium that interfaces to the detection logic 302. In another aspect, the instructions may be downloaded into the detection logic 302 from an external device or network resource that interfaces to the detection logic 302. The program instructions, when executed by the detection logic 302, provide aspects of a decoding system as described herein.

As a result, aspects of the detection system operate to process a received waveform to detect the presence of a jammer. In an aspect, when a jammer is detected, a detection indicator is generated that is used to adjust a power-vs-linearity characteristic of a receiver. It should be noted that the detection logic 302 illustrates just one implementation and that other implementations are possible within the scope of the aspects.

Figure 4:
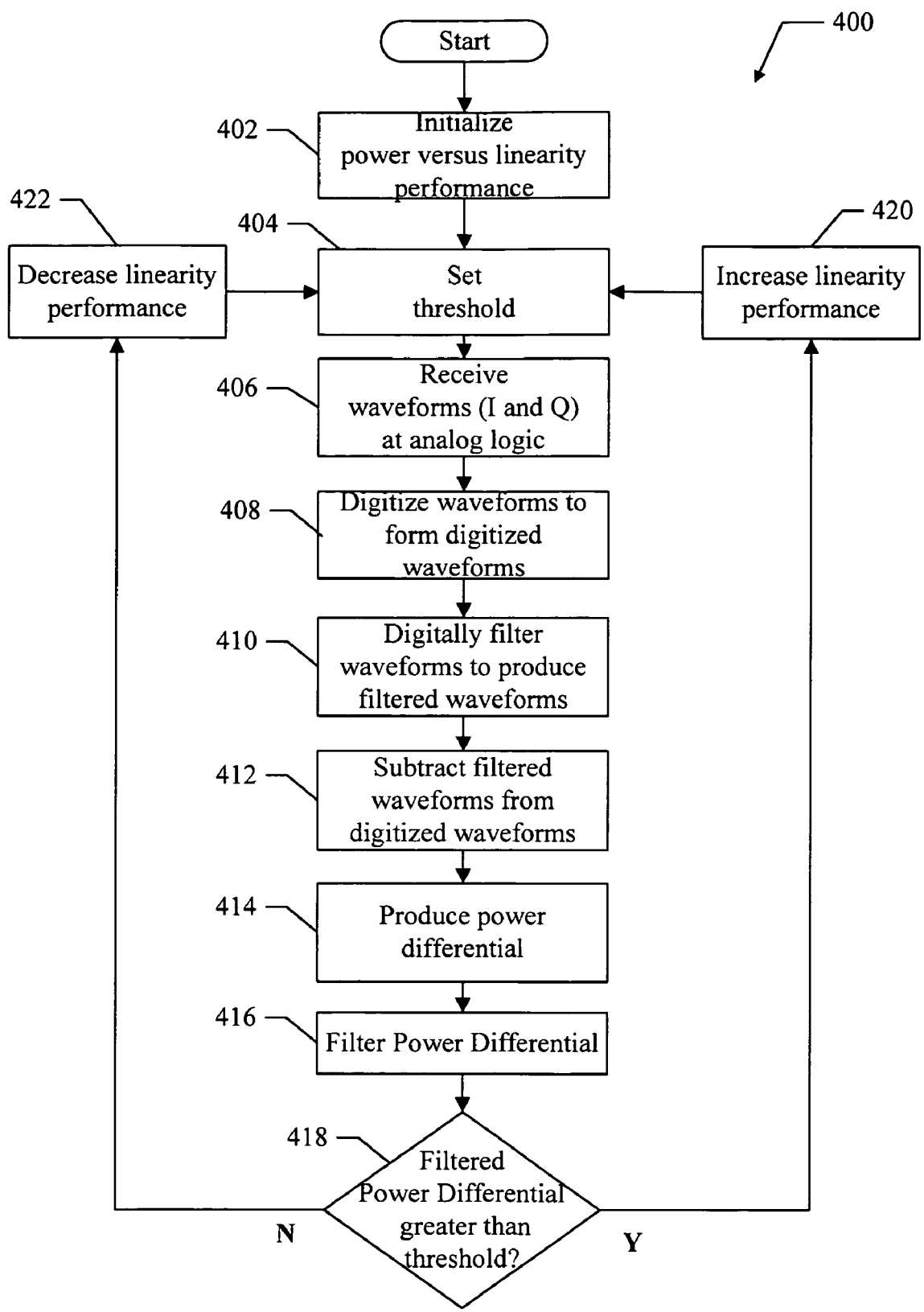
FIG. 4 shows a method for use in aspects of a detection system.

FIG. 4 shows an aspect of a method 400 for use in aspects of a detection system. For clarity, the method 400 is described herein with reference to the receiver 200 and the detection logic 302. For example, in an aspect, the detection logic 302 executes machine-readable instructions to perform the functions described below.

At block 402, a power-vs-linearity performance characteristic for a receiving device is initialized. For example, in an aspect, a signal is applied to the linearity control input 222 to initialize the power-vs-linearity performance of the receiver 200. For example, a bias condition is initialized so that the bias of the amplifier 210, down converter 212, and/or baseband filter 218 are set to selected initial values.

At block 404, a threshold value is set. For example, in an aspect, the threshold value 238 is set by the demodulator 230 to indicate a selected level of demodulator performance.

At block 406, waveforms are received that comprises a desired transmit signal and possible a jammer. For example, the waveform 206 is received at a receiving device. In an aspect, the received waveform comprises I and Q components as illustrated in FIG. 3.

At block 408, the received waveforms are digitized to form digitized waveforms. For example, in an aspect, the A/Ds 304 and 306 operate to digitize the I and Q components of the received waveform to produce digitized I and Q waveforms.

At block 410, the digitized waveforms are digitally filtered to produce filtered digitized waveforms. For example, the filters 308 and 310 operate to filter the digitized waveforms.

At block 412, for each component (I and Q), the filtered digitized waveform is subtracted from the digitized waveform to produce difference waveforms. For example, the combining logic 312 and 314 operate to perform the subtraction function.

At block 414, a power differential is produced. For example, the power determination logic 320 determines the power differential 322 by summing the magnitude of the $I_{DIF}$ waveform and magnitude of the $Q_{DIF}$ waveform. In another aspect, the power determination logic 320 determines the power differential 322 by summing the square of the magnitude of the $I_{DIF}$ waveform and the square of the magnitude of the $Q_{DIF}$ waveform.

At block 416, the power differential is filtered. For example, in an aspect, the filter 324 operates to filter the power differential using a moving average filter that comprises an IIR filter. In another aspect, the filter 324 operates to filter the power differential using a moving average filter that comprises a FIR filter.

At block 418 a test is performed to determine if the filtered power differential exceeds the threshold value. For example, the decision logic 328 operates to determine if the filtered power differential exceeds the threshold value. If the threshold is exceeded, the method proceeds to block 420. If the threshold is not exceeded, the method proceeds to block 422.

At block 420, the threshold is exceeded by the filtered power differential which indicates the presence of a jammer. To distinguish the desired transmit signal from the jammer (at the expense of increase power consumption), the linearity of the receiving device is increased. For example, in an aspect, a bias condition is adjusted so the bias of the amplifier 210, down converter 216, and/or the baseband filter 218 is increased. For example, the bias current of the amplifier 210 is increased.

At block 422 the threshold is not exceeded by the filtered power differential which indicates that a jammer is not present. To conserver power the linearity of the receiving device is decreased. For example, in an aspect, a bias condition is adjusted so the bias of the amplifier 210, down converter 216, and/or the baseband filter 218 is decreased. For example, the bias current of the amplifier 210 is decreased.

Thus, the method 400 operates to provide an aspect of a detection system for use in a receiving device. It should be noted that the method 400 represents just one implementation and that additions, changes, rearrangements, deletions or combinations of the described functions are possible.

Figure 5:
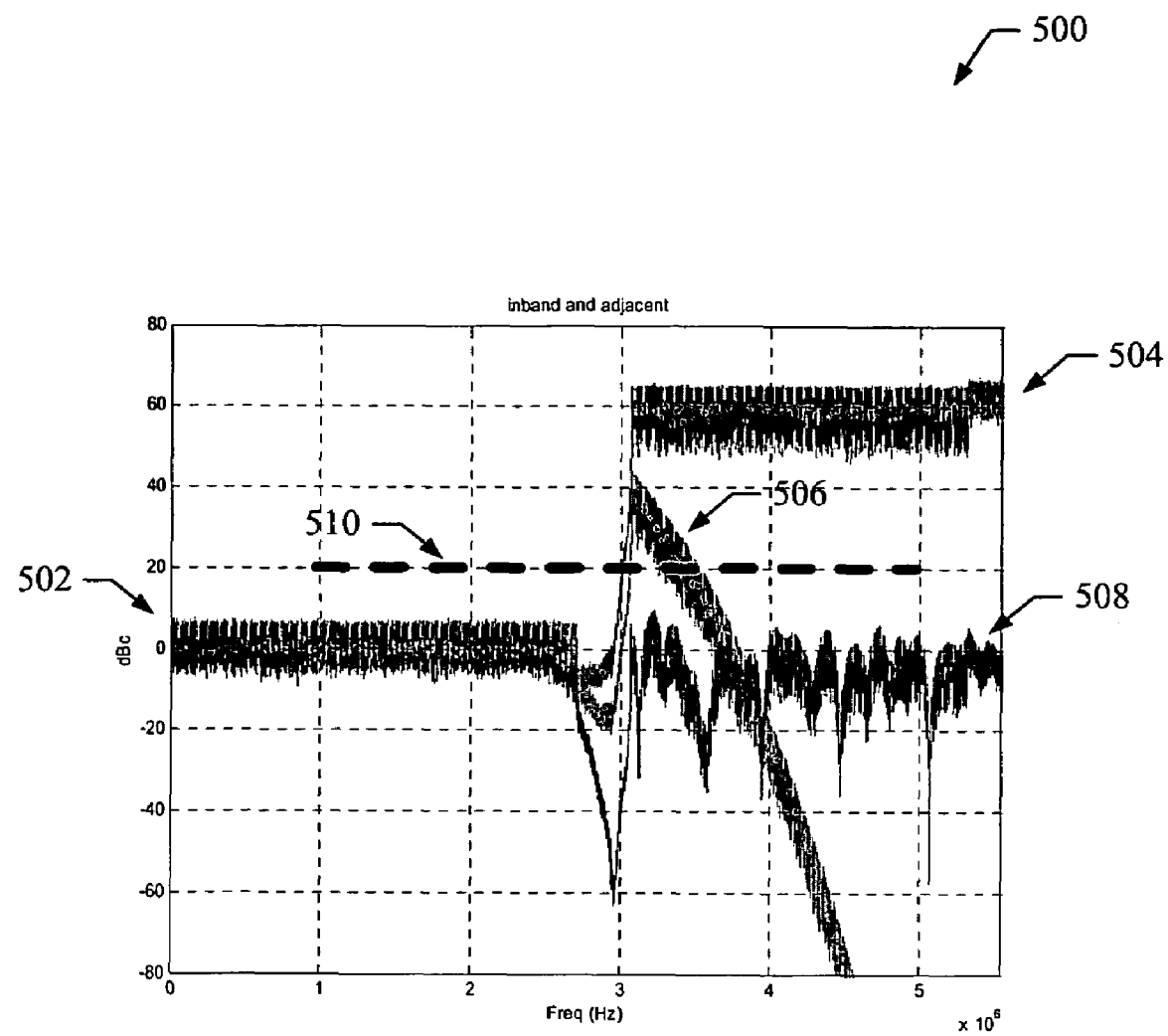
FIG. 5 shows a graph that illustrates the performance of an aspect of a detection system.

FIG. 5 shows a graph 500 that illustrates the performance of an aspect of a detection system. The graph 500 shows a received waveform that comprises a desired transmit signal, as indicated at 502, and a jammer, as indicated at 504. The received waveform is digitized as shown at 506 and input to a digital filter, for example, the filters 308, 310 as shown in FIG. 3. The output of the digital filters 308, 310 is shown at 508. A threshold value is shown at 510. When the filter output 508 is subtracted from the filter input 506 it can be seen that the resulting power differential will be above the threshold 510. Therefore, a jammer is detected and the detection indicator 342 will be output.

Figure 6:
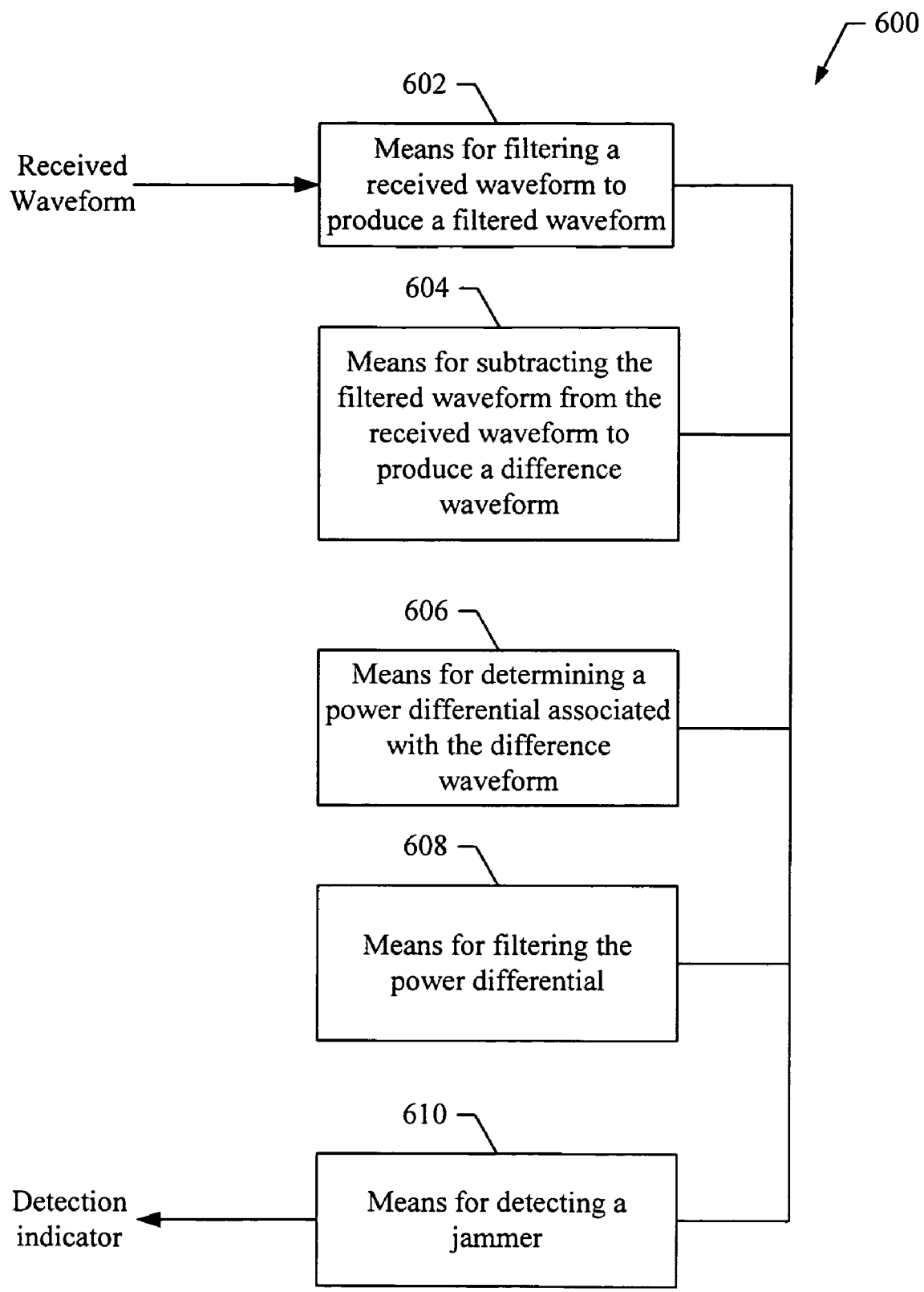
FIG. 6 shows detection logic for use in aspects of a detection system.

FIG. 6 shows detection logic 600 for use in aspects of a detection system. The detection logic 600 comprises a means 602 for filtering a received waveform to produce a filtered waveform. For example, in an aspect, the means 602 comprises the filters 308 and 310.

The detection logic 600 also comprises a means 604 for subtracting the filtered waveform from the received waveform to produce a difference waveform. For example, in an aspect, the means 604 comprises the combining logic 312 and 314.

The detection logic 600 also comprises a means 606 for determining a power differential of the difference waveform. For example, in an aspect, the means 606 comprises the power determination logic 320.

The detection logic 600 also comprises a means 608 for filtering the power differential to avoid false or spurious readings. For example, in an aspect, the means 608 comprises the moving average filter 324.

The detection logic 600 also comprises a means 610 for detecting a jammer. For example, in an aspect, the means 610 comprises the decision logic 328. Thus, the detection logic 600 provides an aspect a detection system.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects Accordingly, while one or more aspects of a detection system have been illustrated and described herein, it will be appreciated that various changes can be made without departing from their spirit or essential characteristics. Therefore, the disclosures and descriptions herein are intended to be illustrative, but not limiting, of the scope of the invention, which is set forth in the following claims.

What is claimed is:

1. A method for detecting a jammer in a received waveform, the method comprising:
   receiving an unfiltered digitized baseband waveform from the output of an analog to digital converter for converting a signal, wherein the digitized baseband waveform comprises a desired signal and a possible jammer;
   filtering the received unfiltered digitized baseband waveform to produce a filtered digitized baseband waveform;
   subtracting the filtered digitized baseband waveform from the unfiltered digitized baseband waveform to produce a difference waveform;
   determining a power level associated with the difference waveform; and
   detecting the presence of a jammer if the power level exceeds a selected threshold.

2. The method of claim 1, further comprising filtering the power level to form a moving average of the power level.

3. The method of claim 2, wherein said filtering the power level comprises filtering the power level using an infinite impulse response (IIR) filter.

4. The method of claim 2, wherein said filtering the power level comprises filtering the power level using a finite impulse response (FIR) filter.

5. The method of claim 1, wherein said determining the power level comprises summing In-phase ($I_{DIF}$) and Quadrature ($Q_{DIF}$) difference waveforms.

6. The method of claim 1, further comprising increasing linearity performance if the jammer is detected.

7. The method of claim 6, wherein said increasing comprises adjusting a bias condition.

8. The method of claim 1, further comprising generating the selected threshold based on demodulator performance.

9. The method of claim 1, further comprising digitizing a down converted waveform to produce the received waveform.

10. An apparatus for detecting a jammer in a received waveform, the apparatus comprising:
    A receiver for receiving an unfiltered digitized baseband waveform from the output of an analog to digital converter for converting a signal, wherein the digitized baseband waveform comprises a desired signal and a possible jammer;
    a filter configured to filter the received unfiltered digitized baseband waveform to produce a filtered digitized baseband waveform;
    combining logic configured to subtract the filtered digitized baseband waveform from the unfiltered digitized baseband waveform to produce a difference waveform;
    power determination logic configured to determine a power level associated with the difference waveform; and
    decision logic configured to detect the presence of a jammer if the power level exceeds a selected threshold.

11. The apparatus of claim 10, further comprising a second filter configured to filter the power level to form a moving average of the power level.

12. The apparatus of claim 11, wherein said second filter comprises an infinite impulse response (IIR) filter.

13. The apparatus of claim 11, wherein said second filter comprises a finite impulse response (FIR) filter.

14. The apparatus of claim 10, wherein said power determination logic operates to sum In-phase ($I_{DIF}$) and Quadrature ($Q_{DIF}$) difference waveforms.

15. The apparatus of claim 10, wherein the decision logic further comprises logic configured to increase linearity performance if the jammer is detected.

16. The apparatus of claim 15, wherein said logic configured to increase linearity performance operates to adjust a bias condition.

17. The apparatus of claim 10, further comprising logic configured to generate the selected threshold based on demodulator performance.

18. The apparatus of claim 10, further comprising an analog to digital (A/D) converter configured to digitize a down converted waveform to produce the received waveform.

19. An apparatus for detecting a jammer in a received waveform, the apparatus comprising:
    means for receiving an unfiltered digitized baseband waveform from the output of an analog to digital converter for converting a signal, wherein the digitized baseband waveform comprises a desired signal and a possible jammer;
    means for filtering the received unfiltered digitized baseband waveform to produce a filtered digitized baseband waveform;
    means for subtracting the filtered digitized baseband waveform from the unfiltered digitized baseband waveform to produce a difference waveform;
    means for determining a power level associated with the difference waveform; and means for detecting the presence of a jammer if the power level exceeds a selected threshold.

20. The apparatus of claim 19, further comprising means for filtering the power level to form a moving average of the power level.

21. The apparatus of claim 20, wherein said means for filtering the power level comprises means for filtering the power level using an infinite impulse response (IIR) filter.

22. The apparatus of claim 20, wherein said means for filtering the power level comprises means for filtering the power level using a finite impulse response (FIR) filter.

23. The apparatus of claim 19, wherein said means for determining the power level comprises means for summing In-phase ($I_{DIF}$) and Quadrature ($Q_{DIF}$) difference waveforms.

24. The apparatus of claim 19, further comprising means for increasing linearity performance if the jammer is detected.

25. The apparatus of claim 24, wherein said means for increasing comprises means for adjusting a bias condition.

26. The apparatus of claim 19, further comprising means for generating the selected threshold based on demodulator performance.

27. The apparatus of claim 19, further comprising means for digitizing a down converted waveform to produce the received waveform.

28. A computer-readable medium having a computer program comprising instructions, which when executed by at least one processor, operate to detect a jammer in a received waveform, the computer program comprising:
  instructions for receiving an unfiltered digitized baseband waveform from the output of an analog to digital converter for converting a signal, wherein the digitized baseband waveform comprises a desired signal and a possible jammer;
  instructions for filtering the received unfiltered digitized baseband waveform to produce a filtered digitized baseband waveform;
  instructions for subtracting the filtered digitized baseband waveform from the unfiltered digitized baseband waveform to produce a difference waveform;
  instructions for determining a power level associated with the difference waveform; and
  instructions for detecting the presence of a jammer if the power level exceeds a selected threshold.

29. The computer program of claim 28, further comprising instructions for filtering the power level to form a moving average of the power level.

30. The computer program of claim 29, wherein said instructions for filtering the power level comprises instructions for filtering the power level using an infinite impulse response (IIR) filter.

31. The computer program of claim 29, wherein said instructions for filtering the power level comprise instructions for filtering the power level using a finite impulse response (FIR) filter.

32. The computer program of claim 28, wherein said instructions for determining the power level comprises instructions for summing In-phase ($I_{DIF}$) and Quadrature ($Q_{DIF}$) difference waveforms.

33. The computer program of claim 28, further comprising instructions for increasing linearity performance if the jammer is detected.

34. The computer program of claim 33, wherein said instructions for increasing comprise instructions for adjusting a bias condition.

35. The computer program of claim 28, further comprising instructions for generating the selected threshold based on demodulator performance.

36. The computer program of claim 28, further comprising instructions for digitizing a down converted waveform to produce the received waveform.

37. At least one processor configured to perform a method for detecting a jammer in a received waveform, the method comprising:
  receiving an unfiltered digitized baseband waveform from the output of an analog to digital converter for converting a signal, wherein the digitized baseband waveform comprises a desired signal and a possible jammer;
  filtering the received unfiltered digitized baseband waveform to produce a filtered digitized baseband waveform;
  subtracting the filtered digitized baseband waveform from the unfiltered digitized baseband waveform to produce a difference waveform;
  determining a power level associated with the difference waveform; and
  detecting the presence of a jammer if the power level exceeds a selected threshold.

38. The method of claim 37, further comprising filtering the power level to form a moving average of the power level.

39. The method of claim 38, wherein said filtering the power level comprises filtering the power differential using an infinite impulse response (IIR) filter.

40. The method of claim 38, wherein said filtering the power level comprises filtering the power differential using a finite impulse response (FIR) filter.

41. The method of claim 37, wherein said determining the power level comprises summing In-phase ($I_{DIF}$) and Quadrature ($Q_{DIF}$) difference waveforms.

42. The method of claim 37, further comprising increasing linearity performance if the jammer is detected.

43. The method of claim 42, wherein said increasing comprises adjusting a bias condition.

44. The method of claim 37, further comprising generating the selected threshold based on demodulator performance.

45. The method of claim 37, further comprising digitizing a down converted waveform to produce the received waveform.

* * * * *

UNITED STATES PATENT AND TRADEMARK OFFICE
CERTIFICATE OF CORRECTION

| | | |
|---|---|---|
| PATENT NO. | : 7,660,569 B2 | Page 1 of 1 |
| APPLICATION NO. | : 11/517118 | |
| DATED | : February 9, 2010 | |
| INVENTOR(S) | : Wei Xiong | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Twenty-eighth Day of December, 2010

David J. Kappos
*Director of the United States Patent and Trademark Office*